Nov. 23, 1948.  J. L. GOSNELL  2,454,445
WEDGE ACTUATOR ATTACHMENT FOR JOURNAL BOXES
Filed Sept. 16, 1946  2 Sheets-Sheet 1
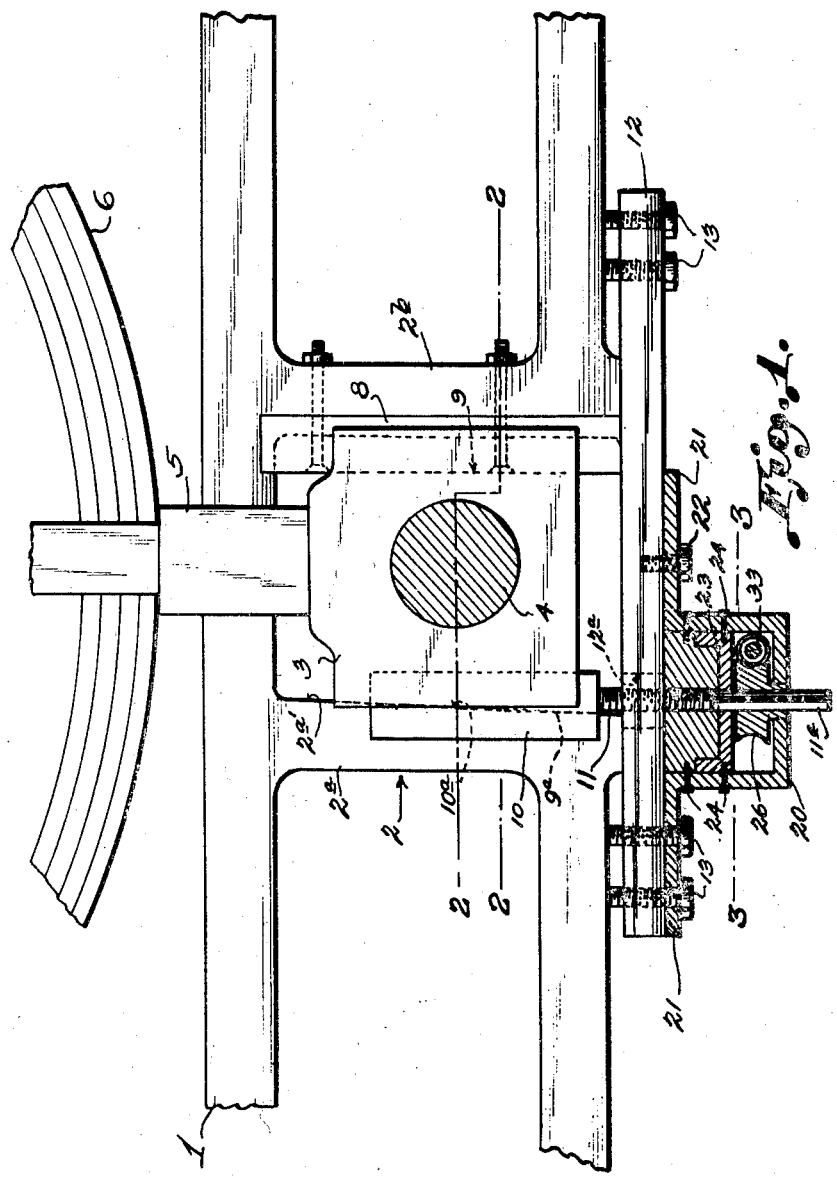

Nov. 23, 1948.         J. L. GOSNELL         2,454,445
WEDGE ACTUATOR ATTACHMENT FOR JOURNAL BOXES
Filed Sept. 16, 1946                  2 Sheets-Sheet 2
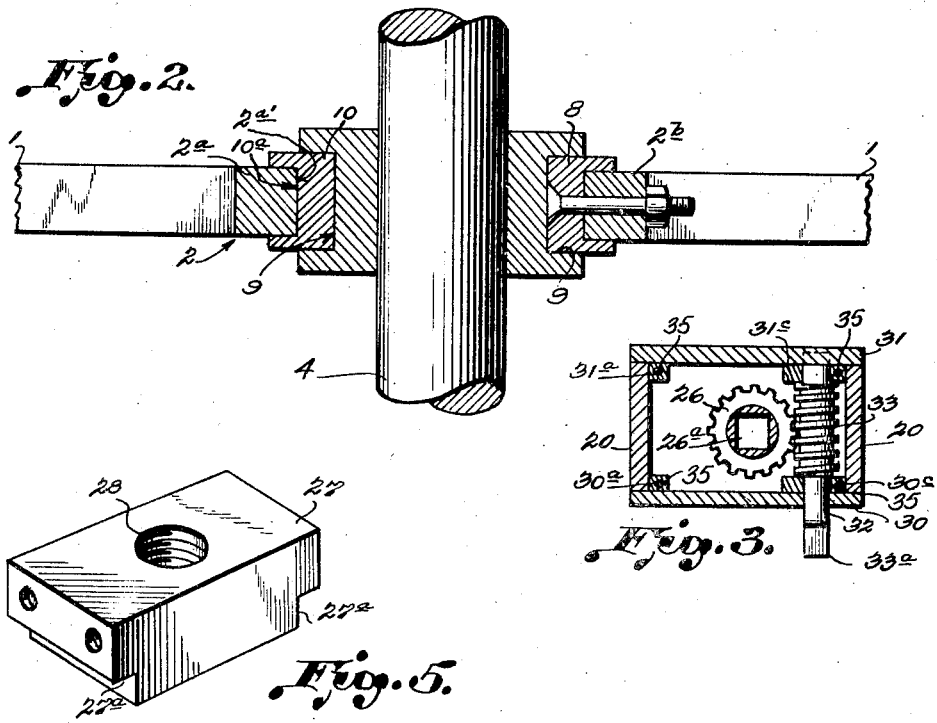
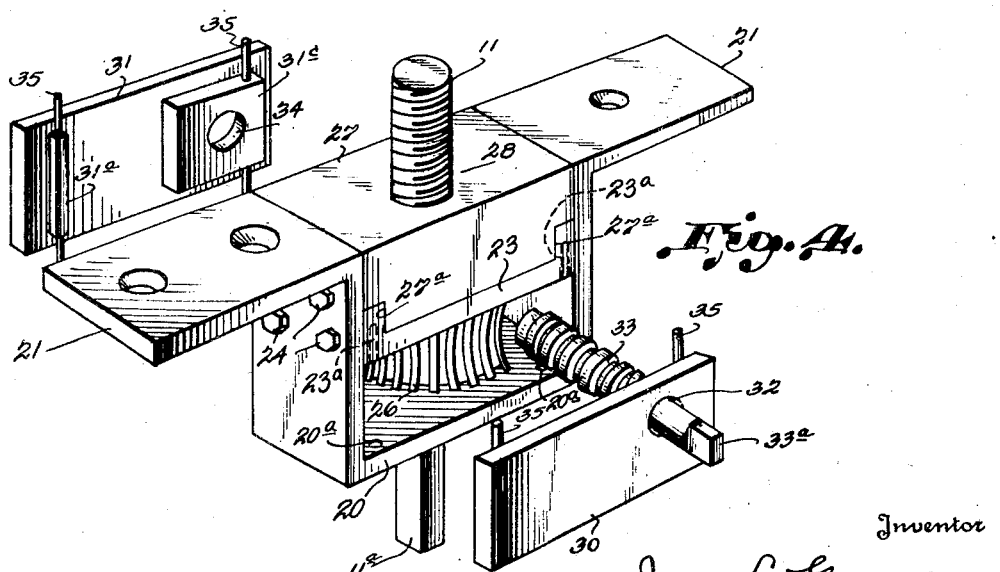
Inventor
Jesse L. Gosnell
By Milo B. Stevens & Co. Attorneys Patented Nov. 23, 1948

2,454,445

UNITED STATES PATENT OFFICE 2,454,445

WEDGE ACTUATOR ATTACHMENT FOR JOURNAL BOXES

Jesse L. Gosnell, St. Joseph, Mo.

Application September 16, 1946, Serial No. 697,286

3 Claims. (Cl. 105—81)

My invention relates to improvements in adjusting devices for journal boxes or the like, with particular reference to those incorporated in locomotive construction, it being understood, however, that the invention is of general utility.

Briefly and generally stated, the invention has for its primary object to improve upon the similarly purposed device covered in my Patent No. 1,748,340, dated February 25, 1930.

More specifically, it is one of the primary objects of the present invention to provide a rigid and more stable sustaining and actuating means for the wedge actuating bolt which is incorporated in the structure, said sustaining means providing an elongated, rather than a short, threaded bore for taking with the threads of the bolt.

And still further, the invention contemplates a wedge bolt sustaining and actuating means in the form of a removable block which is carried by the bearing box of bolt actuating gearing supported by the binder block.

It is also an object of the invention to provide a journal wedge adjusting attachment which can be readily applied to locomotives or other journal boxes incorporating structures without requiring use of unusual skill and which additionally will be a very simple and durable construction.

Other objects and advantages of the invention will become apparent to those skilled in the art as the description proceeds, reference being had to the accompanying drawing, which illustrates a now preferred embodiment of the invention, applied to a locomotive journal box and ancillary structure.

It should be understood, however, as intimated hereinbefore, that the invention is susceptible of other mechanical expressions within the scope and spirit of the subject matter claimed hereinafter, and is not, of course, limited to application to a locomotive or other rolling stock.

In the drawings, wherein the same reference characters have been used to designate the same parts throughout, the several views:

Fig. 1 is a fragmentary elevational view showing a portion of a locomotive frame and illustrating the application of my invention to the adjusting wedge of one of the bearing boxes and its associated carrying pedestal;

Fig. 2 is a cross sectional view taken on the line 2—2 of Fig. 1;

Fig. 3 is a cross sectional view taken on the line 3—3 of Fig. 1;

Fig. 4 is a group perspective view of the attachment removed and with the side bearing plates at opposite sides of the gear box separated from the latter; and Fig. 5 is a perspective view of the wedge bolt sustaining and actuating block removed from its "in use" position in association with the gear box.

Referring specifically to the drawing, brief reference will first be had to the illustrated portion of the improvements which are disclosed in my aforementioned prior patent.

First off, numeral 1 designates a portion of the locomotive frame; 2 the so-called pedestal, having the upright bars 2a, 2b, at the sides between which reciprocates the journal box 3 within which is shown the axle 4. Surmounting the journal box 3 is the saddle 5 which transmits the weight of the frame to the box 3 through the leaf spring 6 in the usual manner. This is a more or less conventional construction which varies in the different locomotives.

It is also customary to provide the bar 2b of the pedestal with a facing or bushing-like wear face 8 which is adapted to seat in the groove 9 of the journal box 3, as indicated. The pedestal bar 2a, at the opposite side, is provided with a wedge-like face plate, which is designated at 10, and is slidably received in a groove 9a, at the opposite side of the journal box 3. The wedge 10 has a tapered surface 10a corresponding to the angle of incline of the inner face 2a' of the bar 2a, as clearly indicated in Fig. 1. Thus, adjusting of the plate or member 10 through the instrumentality of the worm bolt 11, depending from the lower end thereof, prevents transverse play of the box 3, in the pedestal 2. The worm bolt 11 extends through the bar or binder block 12 which, as shown, closes the lower end of the pedestal 2 and may be secured by means of bolts 13, as indicated. Obviously, the hole 12a in the binder block 12, through which the worm bolt 11 extends, will be slightly elongated to allow for slight movement in the direction of the width of the box 3, as the wedge 10 is moved.

As mentioned in my prior patent, the foregoing construction is more or less standard and no novelty, per se, is claimed therefor.

My prior patent also discloses the U-shaped bracket member 20 having lateral arms 21 which have suitable holes to receive the bolts 13, 22, extending from the pedestal frame 2, whereby the U-shaped member may be securely bolted beneath said frame and against the binder block 12. The U-shaped frame 20 is provided with an inner U-shaped plate 23, which is secured against the arms of the first mentioned U-shaped plate by means of bolts 24. It is to be noted that in the prior patent the ends of the second mentioned U-shaped plate 23 lie flush with the top surfaces of the lateral arms 21 so as not to interfere with the mounting of the first mentioned U-shaped plate contiguous with the bottom of the binder bar 12. The space between the two U-shaped plates 20, 23, is adapted to receive a worm wheel 26, and the second mentioned U-shaped plate—namely 23—has a hole through which the member 11 is adapted to project.

So much for the disclosures herein which are common to what is shown in my aforesaid prior patent.

Coming now to the present improvements, it will be noted that the worm wheel or gear 26, instead of having a concentric worm-threaded opening, is provided with an opening 26a, which is square in cross section to slidably receive the squared lower end portion 11a of the wedge bolt 11. Thus, it will be noted that the wedge bolt 11, as herein disclosed, differs from the wedge bolt of my prior patent by being square for a substantial distance of its length, beginning at the lower end.

This brings us to the improved sustaining and actuating means for the wedge bolt, same taking the form of block 27, which is supported by the second mentioned U-shaped plate 23, which forms the top of the compartment within which works the worm wheel 26.

The wedge bolt sustaining and actuating block 27 has the worm threaded hole 28, the threads of which take with the threads of the wedge actuating bolt 11. Thus, when the bolt 11 is turned, as will be hereinafter explained, by the gear 26, the meeting of the block threads 28 causes the bolt to be actuated up or down to effect proper positioning of the wedge 10.

The use of the wedge bolt actuating and sustaining block 27, not only forms a much better support for the wedge bolt than did the threaded concentric hole in the gear 26 of my earlier patent, but also the present structure lends itself to ready application to a locomotive or other journal box adjusting structure which is characterized simply by a bolt threaded upwardly into a bearing and having its lower end squared for the application of a wrench. My previously patented structure was not, of course, adapted to an installation characterized by a bolt having a squared end portion.

As in the case of my prior patent, the open side of the box-like space defined between the plates 20, 23, is adapted to be closed at either side by means of closure plates 30, 31, from the inner faces of each of which project a transverse rib and boss, as denoted at 30a, 30c and 31a, 31c, respectively, such bosses and ribs engaging the bight portions of plates 20, 23, and the inner faces of the legs of plate 20 so as to locate the closure plates against shifting. Closure plates 30, 31 are held in place by pins or the like 35, extending through the respective bosses and ribs to be received in holes 20a, 23a, of plates 20, 23. A bearing hole 32 extends through the boss 30c to receive the worm 33, which meshes with the worm wheel 26. The other boss-like portion 31c has a bearing 34 receiving the end of the worm 33. The worm 33 has a squared end extension 33a, projecting from the outer face of the plate 30, whereby it can be turned by the application of a ratchet wrench or the like.

From the foregoing, it will be obvious that when the worm shaft 33 is turned, the worm wheel 26 will be actuated along with the wedge bolt 11, by reason of the sliding engagement of the latter in the square central hole of the worm wheel 26. The engagement of the wedge bolt threads in the threaded hole 28 of the block 27 effects actuation of the wedge bolt, as previously indicated.

In conclusion, it is believed to be obvious that the wedge 10 can be readily adjusted by simply inserting a ratchet wrench between the spokes of the engine wheel and engaging same with the squared end 33a of the worm shaft 33. The device can be readily applied without removing the binder bar 12. Adjustments can be made by the engineer while on a trip, thus obviating the danger of injury to the working parts through pounding of the bearing box in its pedestal and this without the necessity of crawling under the engine or attempting to manipulate nuts or other securing devices from an awkward position.

Having thus described my invention, what I claim as new, and desire to secure by Letters Patent is:

1. In a locomotive having a reciprocable journal box and mounted journal wedge, means for adjusting the wedge with respect to the journal box comprising a gear box including a U-shaped bracket adapted to be secured to the locomotive frame, a second U-shaped bracket having its lower wall spaced above the lower wall of the first-named bracket and its side walls secured to the inner sides of the side walls of the latter, a horizontally-disposed worm wheel within the space between said bottom walls of said brackets, said worm wheel being provided with a concentric flat-sided hole therethrough, a sustaining block supported by said second bracket and provided with a threaded hole extending vertically therethrough, said bottom walls being provided with holes therethrough disposed in vertical alignment with said holes in said wheel and block, a vertically-extending wedge bolt having a squared lower end portion slidably received in the wheel-hole and its upper end portion threadedly engaged in the block-hole in said block, said upper end portion being engageable with the wedge, and means for meshing with said wheel for operating the same.

2. In a locomotive having a reciprocable journal box and mounted journal wedge, means for adjusting the wedge with respect to the journal box comprising a gear box including a U-shaped bracket adapted to be secured to the locomotive frame, a second U-shaped bracket having its lower wall spaced above the lower wall of the first-named bracket and its side walls secured to the inner sides of the side walls of the latter, the upper marginal edges of said side walls of said second bracket terminating below the upper marginal edges of said side walls of said first bracket, a horizontally-disposed worm wheel within the space between said bottom walls of said brackets, said worm wheel being provided with a concentric flat-sided hole therethrough, a sustaining block supported by said second bracket and provided with a threaded hole extending vertically therethrough, said block having opposite end portions engaging said upper marginal edges of said second bracket and its upper surface being substantially flush with said upper marginal edges of said first bracket, said bottom walls being provided with holes therethrough disposed in vertical alignment with said holes in said wheel and block, a vertically-extending wedge bolt having a squared lower end portion slidably received in the wheel-hole and its upper end portion threadedly engaged in the block-hole in said block, said upper end portion being engageable with the wedge, and means for meshing with said wheel for operating the same.

3. In a locomotive having a reciprocable journal box and mounted journal wedge, means for adjusting the wedge with respect to the journal box comprising a gear including a U-shaped bracket adapted to be secured to the locomotive frame, a second U-shaped bracket having its lower wall spaced above the lower wall of the first-named bracket and its side walls secured to the inner sides of the side walls of the latter, the upper marginal edges of said side walls of said second bracket terminating below the upper marginal edges of said side walls of said first bracket, a horizontally-disposed worm wheel within the space between said bottom walls of said brackets, said worm wheel being provided with a concentric flat-sided hole therethrough, a sustaining block supported by said second bracket and provided with a threaded hole extending vertically therethrough, said block having opposite end portions engaging said upper marginal edges of said second bracket and its upper surface being substantially flush with said upper marginal edges of said first bracket, said bottom walls being provided with holes therethrough disposed in vertical alignment with said holes in said wheel and block, removable securing means extending through those portions of said side walls of said first bracket which are above said upper marginal edges of said second bracket and entering said end portions of said block, a vertically extending wedge bolt having a squared lower end portion slidably received in the wheel-hole and its upper end portion threadedly engaged in the block-hole in said block, said upper end portion being engageable with the wedge, and means for meshing with said wheel for operating the same.

JESSE L. GOSNELL.

REFERENCES CITED

The following references are of record in the file of this patent:

UNITED STATES PATENTS

| Number | Name | Date |
|---|---|---|
| 1,748,340 | Gosnell | Feb. 25, 1930 |
| 1,966,209 | Miller | July 10, 1934 |